(12) United States Patent
Kim et al.

(10) Patent No.: US 12,286,811 B2
(45) Date of Patent: Apr. 29, 2025

(54) DOOR HANDLE HAVING VEIN AUTHENTICATION FUNCTION

(71) Applicant: LG ELECTRONICS INC., Seoul (KR)

(72) Inventors: Hyun Chul Kim, Seoul (KR); Junghan Ryu, Seoul (KR); Jung Hoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 225 days.

(21) Appl. No.: 17/927,813

(22) PCT Filed: Feb. 4, 2021

(86) PCT No.: PCT/KR2021/001471
§ 371 (c)(1),
(2) Date: Nov. 25, 2022

(87) PCT Pub. No.: WO2021/241845
PCT Pub. Date: Dec. 2, 2021

(65) Prior Publication Data
US 2023/0212876 A1  Jul. 6, 2023

(30) Foreign Application Priority Data
May 25, 2020 (KR) .................. 10-2020-0062589

(51) Int. Cl.
*E05B 1/00* (2006.01)
*G06V 40/145* (2022.01)
(Continued)

(52) U.S. Cl.
CPC .............. *E05B 1/00* (2013.01); *G06V 40/145* (2022.01); *G07C 9/00563* (2013.01); *G07C 9/37* (2020.01)

(58) Field of Classification Search
CPC ............ E05B 1/00; G07C 9/37; G06V 40/145
See application file for complete search history.

(56) References Cited

U.S. PATENT DOCUMENTS 5,793,881 A * 8/1998 Stiver ................... E05B 1/0015
382/116
7,181,048 B2 * 2/2007 Blume ............... G06V 40/1324
382/313
(Continued)

FOREIGN PATENT DOCUMENTS

JP        4692174 B2     6/2011
KR   10-2007-0042362 A   4/2007
(Continued)

*Primary Examiner* — Mark A Williams
(74) *Attorney, Agent, or Firm* — Birch, Stewart, Kolasch & Birch, LLP

(57) ABSTRACT

There is disclosed a door handle having a vein authentication function including a housing provided in a door; a sensor provided in the housing for sensing a user's hand touching the housing or located in a preset region; a controller receiving a measured value from the sensor part; and an authentication part operating based on a control signal of the controller, photographing the user's hand and transmitting the photograph of the user's hand to the controller, wherein the authentication part has a photographing angle that is variable based on a position of the user's hand.

20 Claims, 12 Drawing Sheets

(51) Int. Cl.
*G07C 9/00* (2020.01)
*G07C 9/37* (2020.01)

(56) References Cited

U.S. PATENT DOCUMENTS

| | | | | |
|---|---|---|---|---|
| 8,805,028 | B2* | 8/2014 | Miura | G07C 9/00563 |
| | | | | 340/5.52 |
| 10,229,309 | B2* | 3/2019 | Unveren | G06V 40/1312 |
| 11,565,657 | B2* | 1/2023 | Min | G06V 40/10 |
| 2002/0028004 | A1* | 3/2002 | Miura | G06V 10/10 |
| | | | | 382/296 |
| 2003/0086588 | A1* | 5/2003 | Shinada | B60R 25/255 |
| | | | | 382/104 |
| 2004/0071322 | A1* | 4/2004 | Choshi | A61B 5/0059 |
| | | | | 382/115 |
| 2004/0184641 | A1* | 9/2004 | Nagasaka | G06V 40/145 |
| | | | | 382/124 |
| 2005/0047632 | A1* | 3/2005 | Miura | G06V 40/40 |
| | | | | 382/124 |
| 2007/0058841 | A1* | 3/2007 | Miura | G07C 9/00563 |
| | | | | 382/115 |
| 2013/0329031 | A1* | 12/2013 | Miura | G06V 40/145 |
| | | | | 348/77 |
| 2016/0256079 | A1* | 9/2016 | Shimano | A61B 90/30 |

FOREIGN PATENT DOCUMENTS

| | | |
|---|---|---|
| KR | 10-2011-0034223 A | 4/2011 |
| KR | 10-2011-0042759 A | 4/2011 |
| KR | 10-1198512 B1 | 11/2012 |
| KR | 10-2019-0101023 A | 8/2019 |

* cited by examiner

DOOR HANDLE HAVING VEIN AUTHENTICATION FUNCTION

CROSS REFERENCE TO RELATED APPLICATIONS

This application is the National Phase of PCT/KR2021/001471 filed on Feb. 4, 2021, which claims priority under 35 U.S.C. § 119 (a) to Patent Application No. 10-2020-0062589 filed in the Republic of Korea on May 25, 2020, all of which are hereby expressly incorporated by reference into the present application.

TECHNICAL FIELD

The present disclosure relates to a door handle having a vein authentication function configured to authenticate a vein of a hand holding a door handle.

BACKGROUND ART

In general, a door handle is a handle installed on a door and the door is opened and closed by a user pulling or pushing the door handle. The door may be installed at an entrance of a building and door handles may be installed on the outside and the inside of the door, respectively.

An authentication device for authenticating a user may be installed on a door handle or a door. For example, a keypad for inputting a password is installed on a door handle or a door. Accordingly, when a user completes user authentication by inputting a password on the keypad, the door is unlocked. When the door is unlocked, the user opens the door by manipulating the door handle.

Conventionally, a door is unlocked by inputting a password to a keypad. However, when the password is exposed to outsiders, the possibility of theft and unauthorized intrusion could disadvantageously increase. In addition, before manipulating the door handle (e.g., turning or pulling the door handle), the operation of inputting a password on the keypad for user authentication precedes and this could increase inconvenience in use. Even if the user forgets the password, there is another disadvantage in that the door cannot be unlocked. Accordingly, there is a need to improve the disadvantages.

The prior air of the present disclosure is disclosed in KR No. 10-1198512 (registered on Oct. 31, 2012, the title of the invention: DIGITAL DOOR LOCK).

DESCRIPTION OF DISCLOSURE

Technical Problems

Accordingly, an object of the present disclosure is to address the above-noted and other problems and to provide a door handle having a vein authentication function configured to facilitate smooth unlocking of a door by using a user's body information, without inputting a separate password for authentication required to open a door.

Another object of the present disclosure is to provide a door handle having a vein authentication function configured to unlock a door based on a user's vein that gets in contact with the door handle.

A further object of the present disclosure is to provide a door handle having a vein authentication function configured to move a camera for vein authentication based on a user's hand getting in contact with the door handle.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

Accordingly, an object of the present disclosure is to address the above-noted and other problems and to provide a door handle having a vein authentication function which may authenticate a user by photographing body information of the user's hand.

Specifically, an authentication part may photograph and transmit body information related to a vein among body information of the user's hand to a controller, thereby facilitating user authentication without inputting a separate password.

In addition, a sensor part may sense and transmit a location of a user's hand to the controller, thereby facilitating quick and precise operations of moving the authentication part toward the user's hand and photographing the body information.

In addition, a gear body receiving a power of a drive part may be rotatable and a camera may be rotatable together with the gear box, thereby moving the camera along the user's hand.

In addition, the sensor part may be disposed inside the housing. Accordingly, a location of the user's hand getting in contact with the housing or approaching the housing may be quickly measured.

In addition, a driving gear and a driven gear may be provided in the gear box. Accordingly, a box body may be easily rotated by the power of the drive part.

In addition, the housing may be divided into an outer housing and an inner housing, thereby sharing an inner housing disposed therein.

In addition, an outer groove in which a connection line is inserted may be provided on an outer surface of an inner piece, thereby preventing damage to the connection line.

Advantageous Effect

In the door handle having the vein authentication function according to the present disclosure, the camera may photograph the vein of the user's hand after automatically sensing that the user's hand gets in contact with the housing. Accordingly, the user may easily unlock the door, without inputting a password.

In addition, after detecting that the user's hand moves toward the housing based on a non-contact method, the camera may photograph the vein of the user's hand. Accordingly, the spread of virus through the door handle may be blocked.

In addition, the camera may be rotatable toward the direction of the user's hand based on the position of the user's hand touching the housing to photograph the vein of the user's hand. Accordingly, the vein of the user's hand at various positions may be easily measured, thereby improving a vein recognition rate.

In addition, instead of using a contact-based authentication method such as password input or fingerprint recognition, the user may be authenticated using a non-contact method configured to photograph veins. Accordingly, the spread of virus and germs by contact may be blocked.

In addition, the operation of rotating the gear box by using the power of the drive part may be performed in a relatively narrow space. Accordingly, space utilization may be increased.

In addition, the driving gear and the driven gear may be disposed inside the gear box to accurately transmit the power of the drive part. Accordingly, the measurement accuracy by controlling the rotation angle of the camera.

The camera may be rotated together with the gear box to reduce the number of components for moving the camera. Accordingly, production costs may be reduced.

In addition, the sensor part may be installed at a plurality of positions, thereby quickly measuring the position of the user's hand touching the housing or approaching the housing. Accordingly, ease of use may be improved.

In addition, the housing may consist of the plurality of housings and the parts disposed inside the housing may be used in common, thereby reducing the production costs.

In addition, the housing may be divided into the outer housing and the inner housing. Accordingly, the inner housing disposed inside the housing may be used in common, thereby reducing the production costs.

In addition, the outer groove in which the connection line is inserted may be provided on the outside of the inner piece, thereby preventing damage to the connection line and reducing the maintenance cost.

Specific effects are described along with the above-described effects in the section of Detailed Description.

DETAILED DESCRIPTION OF EXEMPLARY EMBODIMENT

Figure 1:
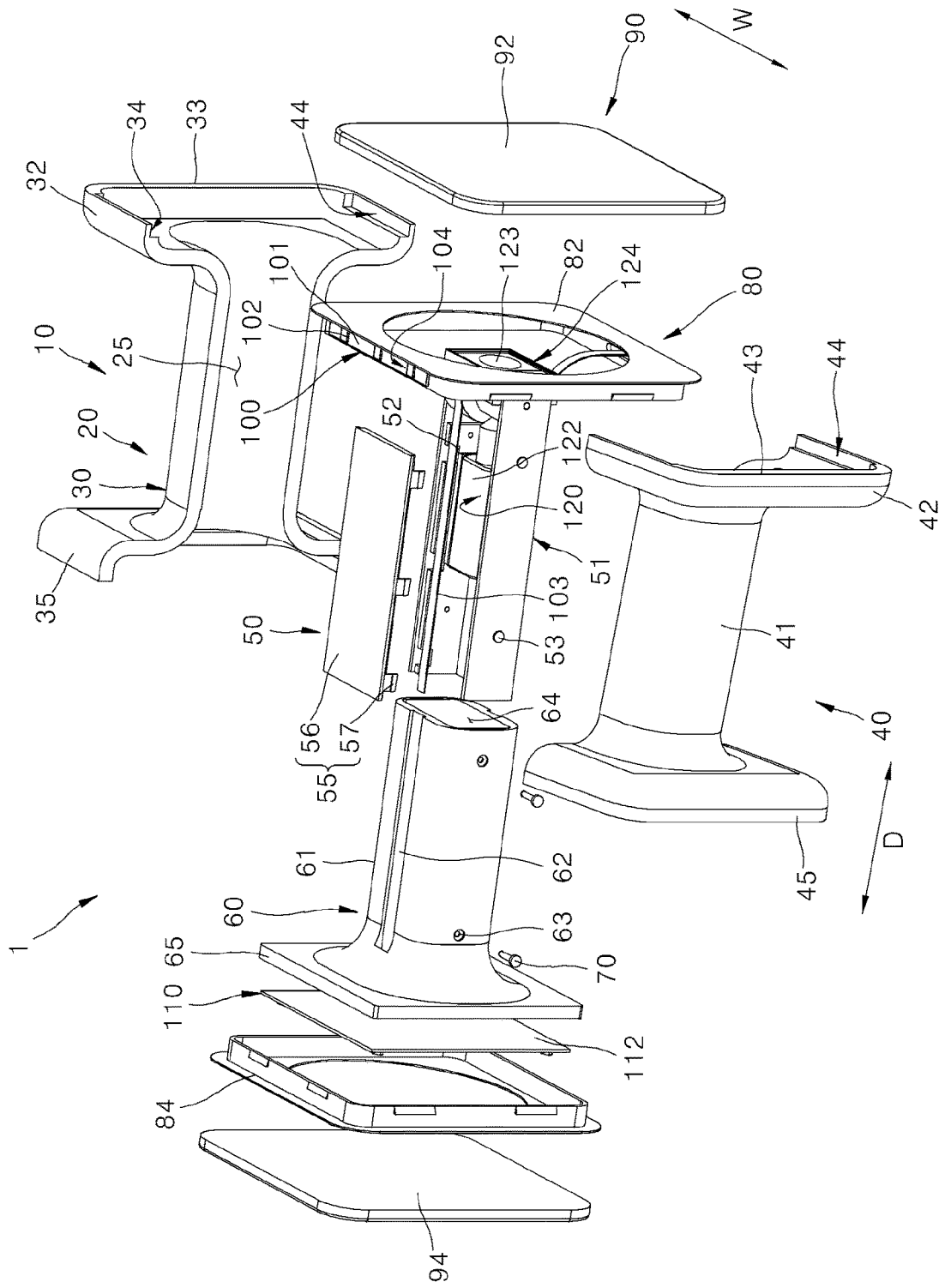
FIG. 1 is an exploded perspective view of a door handle having a vein authentication function according to an embodiment of the present disclosure.

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

Figure 2:
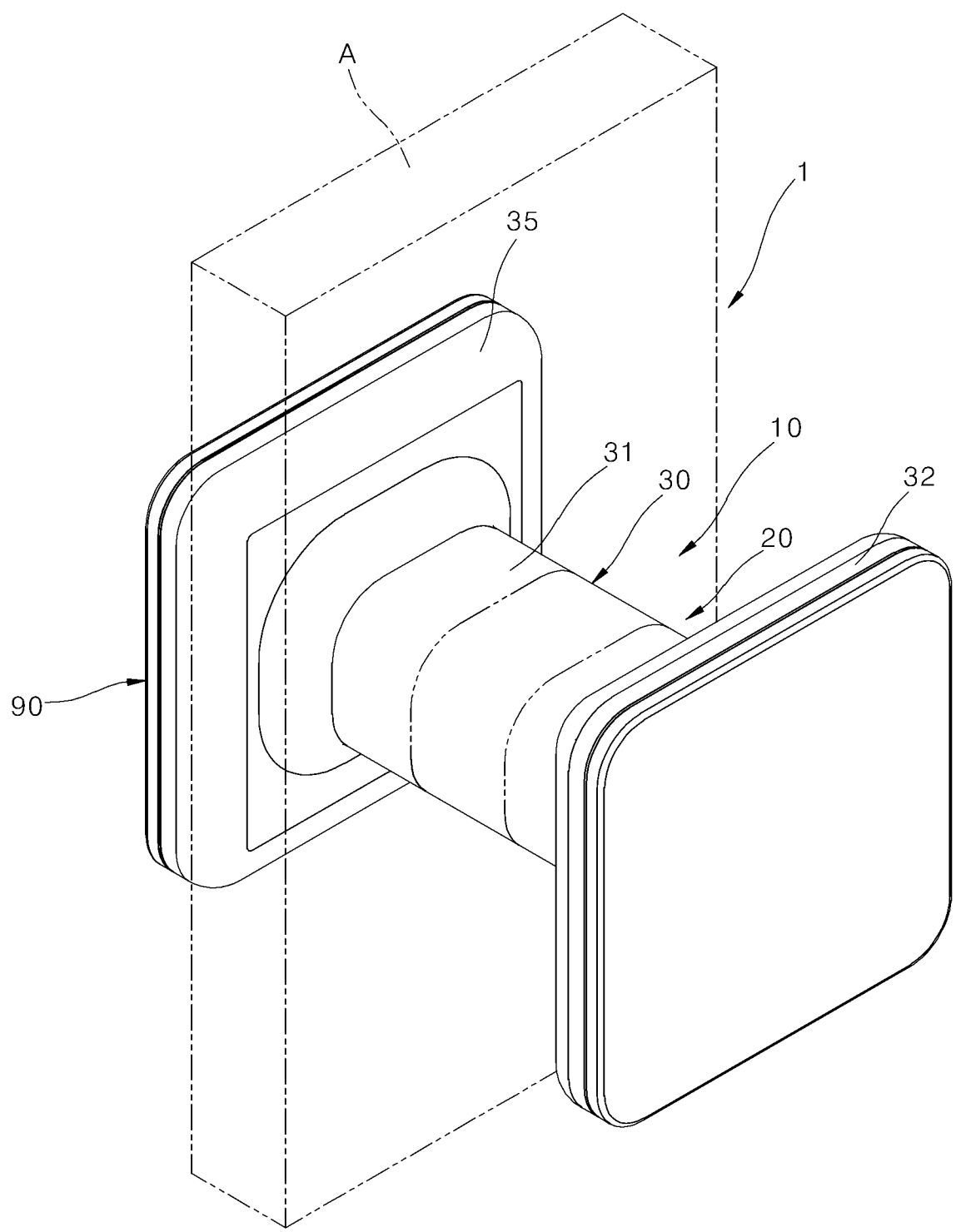
FIG. 2 is a perspective view showing a coupling state of a door handle having a vein authentication function according to an embodiment of the present disclosure.
Figure 3:
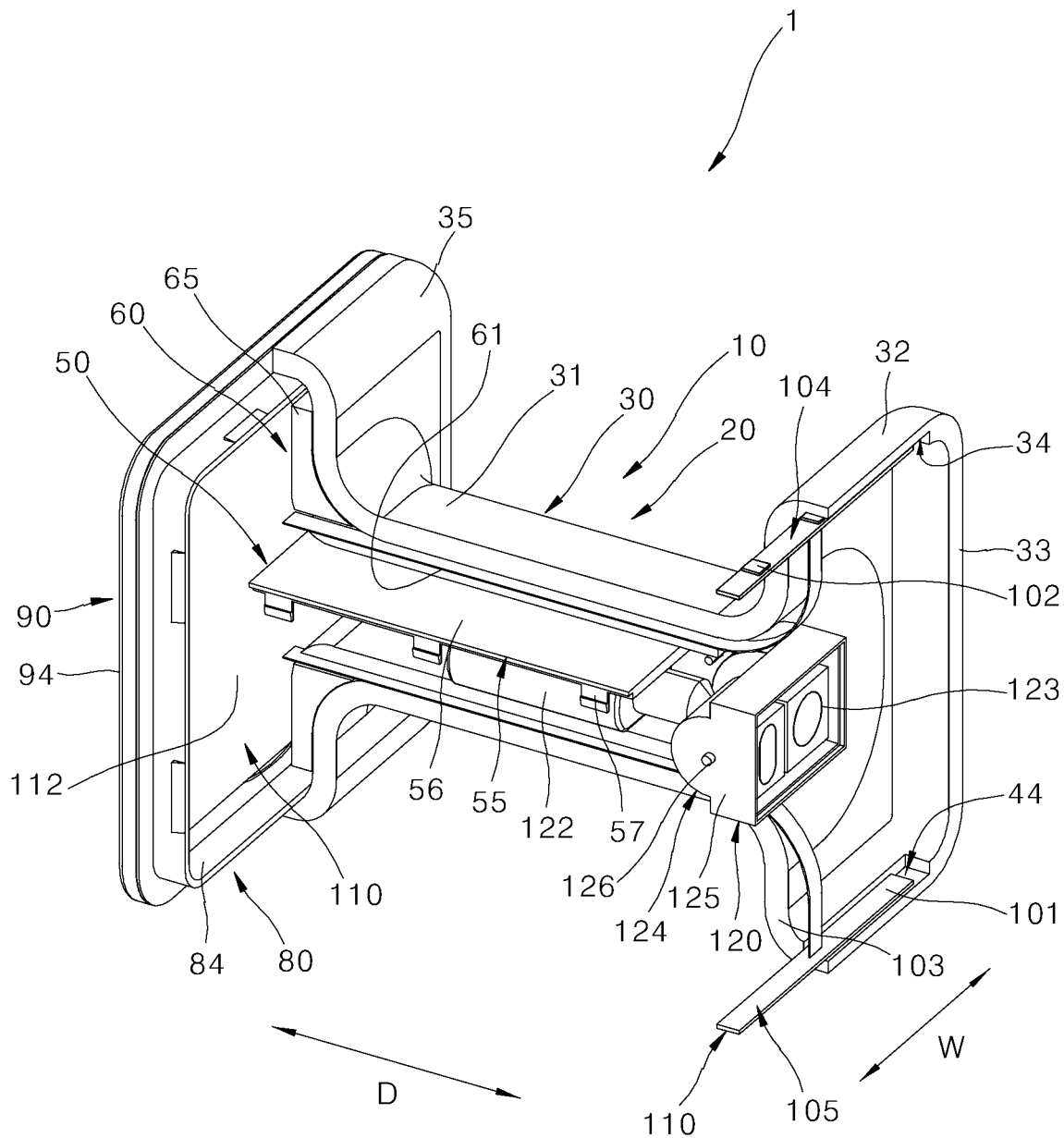
FIG. 3 is a partially cut-away perspective view showing a state where an authentication part is installed in a housing according to an embodiment of the present disclosure.

FIG. 1 is an exploded perspective view of a door handle 1 having a vein authentication function according to an embodiment of the present disclosure. FIG. 2 is a perspective view showing a coupling state of a door handle 1 having a vein authentication function according to an embodiment of the present disclosure. FIG. 3 is a partially cut-away perspective view showing a state where an authentication part 120 is installed in a housing 10 according to an embodiment of the present disclosure;

As shown in FIGS. 1 to 3, the door handle 1 having the vein authentication function according to the embodiment may include a housing 10, a controller 110 and an authentication part 120.

The housing 10 may be implemented in various modifications within the technical feature to be installed in a door (A). Vein authentication may be performed while the user's hand (H) is in contact with the housing 10. Alternatively, vein authentication may be performed in a state where the user's hand (H) is positioned in a set area away from the housing 10.

The housing 10 may be formed in a handle shape and may protrude forward of the door (A). When the user is positioned in front of the door (A), the housing 10 may be protruded from a front of the door (A).

Inside the housing 10 may be disposed a sensor part 100, a controller 110 and an authentication part 120. The housing 10 may be fixed to the front of the door (A), and it may be installed in a shape passing through the door (A) if necessary. The housing 10 according to an embodiment of the present disclosure may protrude from a front side and a rear side of the door (A) through the door (A), and may be formed in a door handle shape that is easy to be held by the user's hand.

The housing 10 may be formed of a single member. If necessary, the housing 10 may be formed of a plurality of members. The housing 10 according to the present disclosure may include at least one of an outer housing 20, an inner housing 50, an inner piece 60, a movement restricting member 70 and a cover 90.

The outer housing 20 may be fixed to the door (A) and the movement may be restricted. The outer housing 20 may be implemented in various modifications within the technical feature that it includes a mounting space 25 formed therein.

The outer housing 20 has a case shape defining an exterior design of the housing 10. A body of the outer housing 20 may be fixed to the door (A) so that movement may be restricted. The outer housing 20 may be formed of a plurality of members to be easily coupled or decoupled so that components such as the authentication part 120 can be easily installed in the outer housing. The outer housing according to an embodiment of the present disclosure may include a first housing 30 and a second housing 40.

The first housing 30 may be implemented in various modifications within the technical feature to surround one width-direction side (e.g., a width-direction (W) right side, viewed in FIG. 1) of the inner housing. The first housing 30 according to an embodiment of the present disclosure may include at least one of a first body 31, a first frame 32 and a first end 35.

The first body 31 may be disposed in a shape penetrating the door (A), and the first body 31 may be implemented in various modifications within the technical feature that the inner housing 50 is disposed inside the first body 31. The first body 31 may have a shape obtained by cutting a square pipe or a round pipe in half. Alternatively, the first body 31 may be provided in a shape partially surrounding the outer side of the inner piece 60 or the inner housing 50 and configured to prevent foreign substances from coming into the authentication part 120 or the controller 110.

The first frame 32 may be extended in front of the first body 31, and the user's hand (H) may be in contact with the first frame 32. The outer circumference of the first frame 32 may be formed longer than the outer circumference of the first body 31. The first frame 32 may be extended to a front of the first body 31 and may be provided in an expanded tube shape. The first frame 32 may protrude toward a lateral surface of the first body 31 so that it may have a shape capable of being held by the user's hand (H). The first frame 32 may be coupled to the second frame having a symmetrical shape, and various modifications such as a tray, a square plate, a circular plate and a triangular plate may be implemented in various shapes of handles.

Hereinafter, a direction in which the first frame 32 is positioned with respect to the first body 31 may be set as a forward direction (or a front direction) and a direction in which the first end 35 is positioned may be set as a rearward direction (a rear direction).

Since the first frame 32 forms a structure that vertically stands in front of the door (A), the user trying to move into a building after opening the door (A) in the forward direction may smoothly place the hand (H) on a rim 33 of the first frame 32.

The sensor part 100 may be disposed inside the first frame 32 and configured to detect a touch of the user's hand (H). In the embodiment of the present disclosure, the rim 33 of the first frame 32 and a rim 43 of a second frame 42 may be formed in a rectangular shape. A first sensor coupling groove 34 for receiving a first sensor 104 of the sensor part 100 may be formed in each inner surface of the rim 33 of the first frame 32 and the rim 43 of the second frame 42. A second sensor coupling groove 44 for receiving a second sensor 105 of the sensor part 100 may be also formed in each inner surface of the rim 33 of the first frame 32 and the rim 43 of the second frame 42, and may face the first sensor coupling groove 34.

A sensor board 101 of the sensor part 100, which will be described below, may be inserted in the first sensor coupling groove 34 and the second sensor coupling groove 44 in order to stably install the sensor 100 in the housing 10.

The first end 35 may be implemented in various modifications within the technical feature to extend to a rear side of the first body 31 and realize the function of the door handle. The first end 35 may be coupled to the second end 45 to form a door handle shape. Accordingly, the user getting out of a building after opening the door (A) from the rear side may move the door (A) by holding a rear side of the outer housing 20.

The first end 35 may extend from the rear side of the first body 31 and configured to function as the door handle together with the second end 45, so that the user's hand (H) may smoothly touch the first end. In addition, the outer circumference of the first body 31 may be longer than the outer circumference of the first end 35. The first end may be formed in an expanded pipe shape extending from the rear side of the first body 31. Since the first end 35 protrudes in a direction of a lateral surface of the first body 31, the shape of the first end 35 may be easily held by the user's hand (H). The first end 35 may be coupled to the second end 45 having a symmetrical shape to be implemented in various modifications (e.g., a plate, a square plate, a circular plate and a triangle plate).

The second housing 40 may be provided in a shape surrounding the other side of the inner housing. The second housing 40 may be implemented in various modifications within the technical feature to be secured to the first housing and configured to define the exterior design of the housing 10. In an embodiment of the present disclosure, the second housing 40 may be provided in a shape symmetrical to the first housing 30, and may include at least one of a second body 41, a second frame 42 and a second end 45.

The second body 41 may be provided in a shape horizontally penetrating the door (A) together with the first body 31. The first body 31 and the second body 41 may be implemented in various modifications within the technical feature that the inner housing 50 or the inner piece 60 are disposed therein. The second body 41 may have a shape obtained by cutting a square pipe or a round pipe in half. Alternatively, the second body 41 may be provided in a shape partially surrounding the outer side of the inner piece 60 or the inner housing 50 and configured to prevent foreign substances from coming into the authentication part 120 or the controller 110.

The second frame 42 may be extended in front of the second body 41, and the user's hand (H) may be in contact with the second frame 42. The outer circumference of the second frame 42 may be formed longer than the outer circumference of the second body 41. The second frame 42 may be extended to a front of the second body 41 and may be provided in an expanded tube shape. The second frame 42 may protrude toward a lateral surface of the second body 41 so that it may have a shape capable of being held by the user's hand (H). The second frame 42 may be coupled to the first frame 32 having a symmetrical shape, and various modifications (e.g., a tray, a square plate, a circular plate and a triangular plate) may be implemented in various shapes of handles.

Since the second frame 42 forms a structure that vertically stands in front of the door (A), the user trying to move into a building after opening the door (A) in the forward direction may smoothly place the hand (H) on a rim 43 of the second frame 42.

The second end 45 may be implemented in various modifications within the technical feature to extend to a rear side of the second body 41 and realize the function of the door handle. The second end 45 may be coupled to the first end 35 to form a door handle shape. A substrate member 112 of the controller 110 may be disposed inside the second end 45.

The second end 45 may extend from the rear side of the second body 41 and configured to function as the door handle together with the first end 35, so that the user's hand (H) may smoothly touch the second end 45. In addition, the outer circumference of the second body 41 may be longer than the outer circumference of the second end 45. The second end 45 may be formed in an expanded pipe shape extending from the rear side of the second body 41. Since the second end 45 protrudes in a direction of a lateral surface of the second body 41, the shape of the second end 45 may be easily held by the user's hand (H). The second end 45 may be coupled to the first end 35 having a symmetrical shape to be implemented in various modifications of various door handle shapes.

The inner housing 50 may be disposed inside the outer housing 20, and may be implemented in various modifications within the technical feature to have the authentication part 120 coupled to an inner surface or a lateral surface thereof. The inner housing 50 according to an embodiment of the present disclosure may be provided in a shape surrounding an outer surface of the authentication part 120. The inner housing 50 may include a base 51 and a housing cover 55.

The base 51 may be configured to surround the authentication part 120, and may be implemented in various modifications within the technical spirit to have an inlet that is open and closed by the housing cover 55. The base 51 according to an embodiment of the present disclosure may be formed in a shape having an open top and surrounding right, left and bottom surfaces of the authentication part 120.

The housing cover 55 may be coupled to the open top of the base 51, and may be implemented in various modifications within the technical feature to be configured to open and close the housing cover 55. The housing cover 55 may be disposed at a position facing the authentication part 120 inside the outer housing 20 or the inner piece 60. The housing cover 55 according to an embodiment of the present disclosure may include cover panel 56 and a hooking member 57 (e.g., a plurality of hooking members 57).

The cover panel 56 may be formed in a plate shape and configured to open and close the open inlet of the base 51. The hooking member 57 may extend toward the base 51 to the cover panel 56 to be locked to a fixing groove 52 provided in the base so that movement may be restricted. The hooking member 57 may be disposed in each of the width-direction sides of the cover panel 56. A plurality of hooking members 57 may be provided along a longitudinal direction D of the cover panel 56 to stably couple the cover panel 56 to the base 51. The hooking member 57 may be formed in a hook shape and a fixing groove 52 (e.g., a plurality of fixing grooves 52) may be provided on an inner surface of the base 51 facing the hooking member 57 so that the hooking member 57 may be inserted in the fixing groove 52 to be hooked.

The inner piece 60 may be disposed between the outer housing 20 and the inner housing 50, and may be implemented in various modifications within the technical feature to surround the outside of the inner housing 50. In addition, the inner piece 60 may be configured to secure the inner housing 50 surrounding the authentication part 120 to the inner surface of the housing 20 and to reduce an impact transferred to the authentication part 120.

The inner piece 60 according to an embodiment of the present disclosure may include inner piece body 61 and a substrate support portion 65.

Various modifications may be implemented within the technical spirit that the inner piece 60 includes a hollow hole 64 in which the inner housing is disposed. The inner housing 50 according to an embodiment of the present disclosure may be formed in a rectangular parallelepiped shape, and the inner piece body 61 surrounding the inner housing 50 may be also formed in a square pipe shape. Since the rotation of the inner housing 50 may be restricted in a state of being inserted in the hollow hole 64 formed in the inner piece body 61, the inner housing 60 may be stably installed.

An outer groove 62 for installing a connection line 103 of the sensor part 100, which will be described below, may be formed on the outside of the inner piece body 61. The outer groove 62 may form a concave groove on the outside of the inner piece body 61 and the outer groove 62 may extend along the longitudinal direction D of the inner piece body 61. Accordingly, since the connection line 103 is installed in a state of being inserted in the outer groove 62, damage to the connection line 103 caused by an external impact may be prevented.

The connection line 103 installed along the outer groove 62 of the inner piece body 61 may be connected to a substrate member 112 of the controller 110 while passing through a substrate support portion 65. Alternatively, the connection line 103 disposed along the outer groove 62 of the inner piece body 61 may be implemented in various modifications such as it may be connected to the substrate member 112 after bypassing an outer periphery of the substrate support portion 65.

In a state where the inner housing 50 is disposed inside the inner piece 60, the movement may be restricted by a movement restricting member 70. To this end, a first coupling hole 53 may be formed in a lateral surface of the inner housing 50, and a second coupling hole 63 may also be formed in a lateral surface of the inner piece body 61. In a state where the first coupling hole 53 and the second coupling hole 63 are in communication with each other, the movement restricting member 70. Various kinds of coupling members including a bolt may be used within the technical spirit that the movement restricting member 70 is moveable between the second coupling hole 63 and the first coupling hole 53 to be secured. In addition, in a state where the inner housing 50 is position inside the inner piece body 61, the movement restricting member 70 may be coupled to the inner housing 50 through the inner piece body 61. Accordingly, various modifications may be possible such as the movement restricting member 70 is coupled to the first coupling hole 53 after passing through the second coupling hole 63.

The substrate support portion 65 may be implemented in various modifications within the technical feature to extend from the inner piece body 61 and support the substrate member 112. The substrate support portion 65 according to an embodiment of the present disclosure may be provided in a shape that is gradually expanded from the rear of the inner piece body 61 to support the controller 110. The rear of the substrate support portion 65 may support the front of the substrate member 112 and have the same shape as the substrate member 112. The substrate member 112 according to an embodiment may be a rectangular plate and the rear of the substrate support portion 65 facing the substrate member 112 may be also formed in a rectangular shape so that the substrate member 112 may be stably supported.

A cover support portion 82 may be disposed between the outer housing 20 and a first cover 92 of the cover 90 which will be described below, and may be implemented in various modifications within the technical spirit to restrict the movement of the first cover 92. The cover support portion 80 according to an embodiment of the present disclosure may include a first support portion 82 and a second support portion 84.

The first support portion 82 may be disposed between the outer housing 20 and a first cover 92 of the cover 90 which will be described below, and may be implemented in various modifications within the technical feature to restrict the movement of the first cover 92. A hollow may be formed at a position inside the first support portion 82, and the position may face a camera 123 of the authentication part 120. Accordingly, the camera 123 of the authentication part 120 may easily photograph a vein in the user's hand H through the hollow of the first support portion 82 and the cover 90. The outside of the first support portion 82 may form a rectangular frame and the sensor part 100 may be provided between the first support portion 82 and the outer housing 20.

The second support portion 84 may include a second support portion 84 disposed between the outer housing 20 and the second cover 94 of the cover 90, which will be described below, and configured to restrict the movement of the second cover 94. The second cover 94 may be disposed behind the second support portion 84 and a substrate support portion 65 of the inner piece 60 may be in front of the second support portion 84. A substrate member 112 of the controller 110 may be disposed between the second support portion 84 and the substrate support portion 65.

The cover 90 may be implemented in various modifications within the technical spirit to close airtight at least one of both open ends of the outer housing 20. The cover 90 according to an embodiment may include a first cover 92 and a second cover 94.

The first cover 92 may be implemented in various modifications within the technical feature to close airtight the front of the outer housing 20. The first cover 92 according to an embodiment of the present disclosure may be formed in a panel shape and made of a transparent material or a light-transmitting material. Accordingly, the camera 123 of the authentication part 120 may easily photograph the vein of the user's hand H through the first cover 92. The first cover 92 may be secured to the front area of the first support portion 82. The first cover 92 may be coupled to the first support portion 82 by using various coupling member including an adhesive, a bolt member and a connecting ring. Alternatively, the coupling of the first cover 92 may be implemented in various modifications such as in a state where the first cover 92 is temporarily coupled to the front area of the first support portion 82, the rims 33 and 43 of the housing 10 may press the first cover in a direction toward the first support portion 82 to restrict the movement of the first cover 92.

The second cover 94 may be implemented in various modifications within the technical spirit to close airtight the rear of the outer housing 20. The second cover 94 according to an embodiment of the present disclosure may have a panel shape that is equal to the shape of the first cover 92. The second cover 94 may be formed of an opaque material and various modifications such as forming the second cover 94 using a transparent material having a color for the interior may be possible. The second cover 94 may be secured to the rear of the second support portion 84. The second cover 94 may be coupled to the second support portion 84 by using various coupling members including an adhesive, a bolt member and a connection ring. Alternatively, the coupling of the second cover 94 may be implemented in various modifications such as in a state where the second cover 94 is temporarily coupled to the rear area of the second support portion 84, the rims 33 and 43 of the housing 10 may press the second cover 94 in a direction toward the second support portion 84 to restrict the movement of the second cover 92.

The sensor part 100 may be disposed in the housing 10, and may be implemented in various modifications within the technical spirit to detect contact or non-contact of the user's hand H on the housing 10. The sensor part 100 according to an embodiment of the present disclosure may be disposed inside the inner housing 20 and configured to detect the user's hand H in a preset area in a state of touching or non-touching the outside of the outer housing 20. The outer housing 20 according to an embodiment may include rectangular rims 33 and 43 of the outer housing 20, and a plurality of sensor parts 100 may be disposed inside the rims 33 and 43. The shape of the rims 33 and 43 may not be limited to the rectangular one, and various shapes including a circular, oval and triangle shape may be applied.

When the sensor part 100 senses the user's hand H in a non-contact manner, the user's hand may be placed in a preset area. For example, the controller 110 may store a set area for the user's hand H to be positioned. When the user's hand H is located in the preset area in a state of non-contacting with the housing 10, the location of the user's hand H may be measured by the sensor part 100. Various modifications may be possible such as the motion of the user and the motion of the user's hand H may be captured by a separate motion detection camera and transmitted to the controller 110.

Various types of non-contact sensors may be used as the sensor part 100 within the technical spirit that the authentication part 120 is configured to photograph body information of the user's hand H to authenticate the user, in a state where the user hand H is not in contact with the housing 10.

In the present disclosure, two sensors may be installed in the housing 10 and the sensors may be disposed to face each other. The sensors installed inside the housing 10 may be disposed in a vertical direction or a horizontal direction of the first support portion 82. However, the present disclosure is not limited thereto and it is obvious that the number and installation directions of the sensors installed in the housing 10 may be variable based on model versions.

For example, when users' hand H touches an upper surface of the door handle 1 having the vein authentication function, the sensor part 100 disposed inside the outer housing 20 may detect the touch of the user's hand and transmit a measured value to the controller 110. The sensor part 100 may include a first sensor 104 and a second sensor 105 that are provided between the outer housing 20 and the first support portion 82. The first sensor 104 may be installed between an upper area of the first support portion 82 and the outer housing 20. The second sensor 105 may be installed between a lower area of the first support portion 82.

A first sensor coupling groove 34 having a concave shape may be provided in an inner surface of the first housing 30 facing the first sensor 104 and an inner surface of the second housing 40. The first sensor coupling groove 34 may form a band-shaped groove extending along a width direction W of the outer housing 20. Since the first sensor 104 is inserted in the first sensor coupling groove 34, the first sensor 104 may be prevented from damage and may be stably coupled.

A second sensor coupling groove 44 having a concave shape may be provided in an inner surface of the first housing 30 facing the second sensor 105 and an inner surface of the second housing 40. With respect to the first support portion 82, the first sensor coupling groove 34 may be positioned in an upper area and the second sensor coupling groove 44 may be positioned in a lower area. The second sensor coupling groove 44 may form a band-shaped groove extending along a width direction W of the outer housing 20, while facing the first sensor coupling groove 34. Since the second sensor 105 is inserted in the second sensor coupling groove 44, the second sensor 105 may be prevented from damage and may be stably coupled.

In addition, the first sensor 104 may include a sensor substrate 101 disposed inside the first sensor coupling groove 34, with a plate shape, a sensor element 102 arranged on the sensor substrate 101 and configured to detect a touch of the user's hand H on the outer housing 20, and a connection line 103 connecting the sensor substrate 101 with the substrate member 112 of the controller 110. The second sensor 105 may have the same configuration as the first sensor 104, thereby omitting detailed description of the second sensor.

The controller 110 may be implemented in various modifications within the technical feature to control a drive part 122 of the authentication part 120 and receive a measured value from the sensor part 100 and a measured value from the camera 123. The controller 110 according to an embodiment of the present disclosure may have a plurality of electrical components installed on the plate-shaped substrate member 112. The substrate member 112 may be disposed between the substrate support portion 65 and the second support portion 84, and may be connected to the sensor part 100, the camera 123 and the drive part 122 by a wire or wirelessly.

Figure 4:
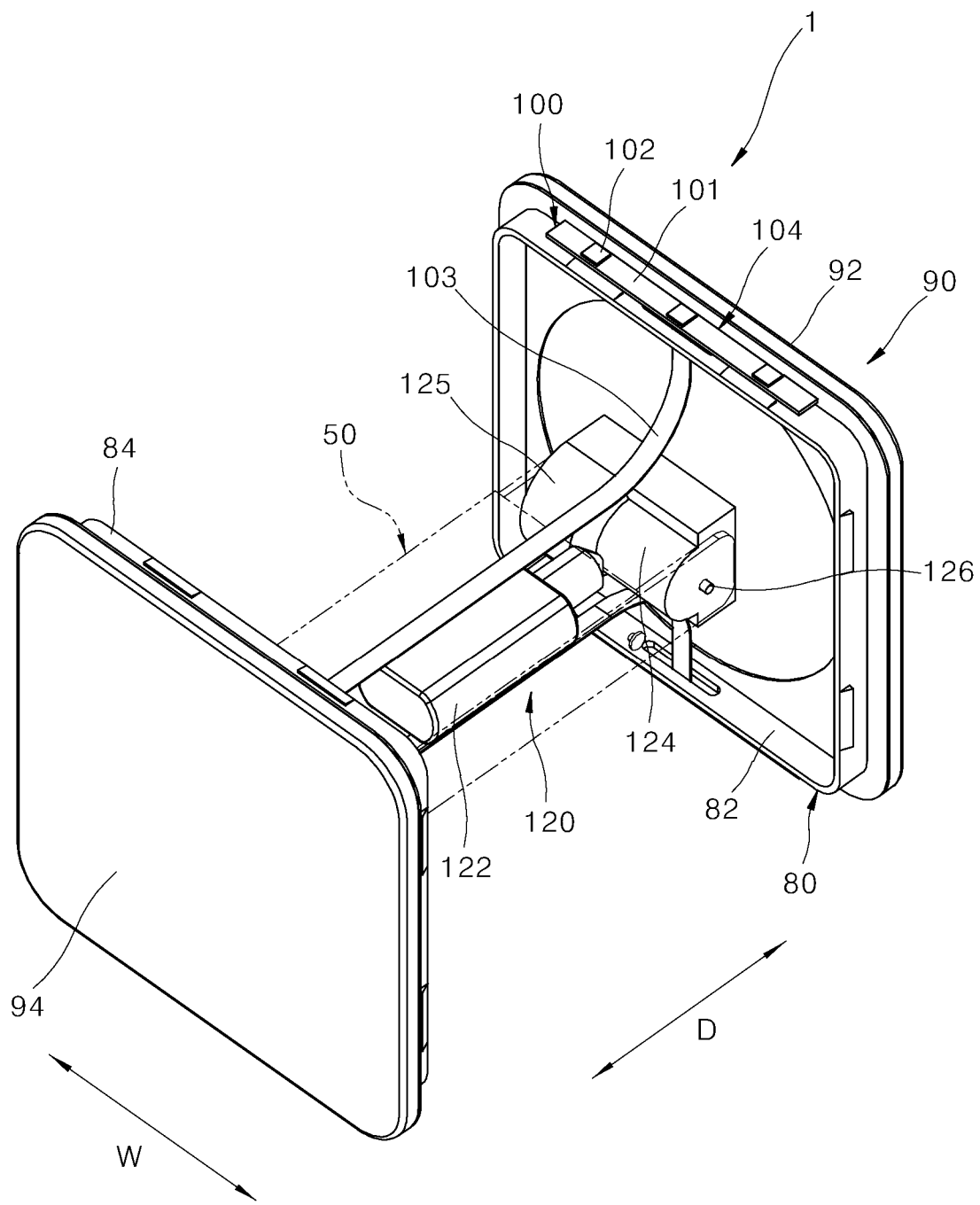
FIG. 4 is a perspective view showing an installation state of an authentication part according to an embodiment of the present disclosure.
Figure 5:
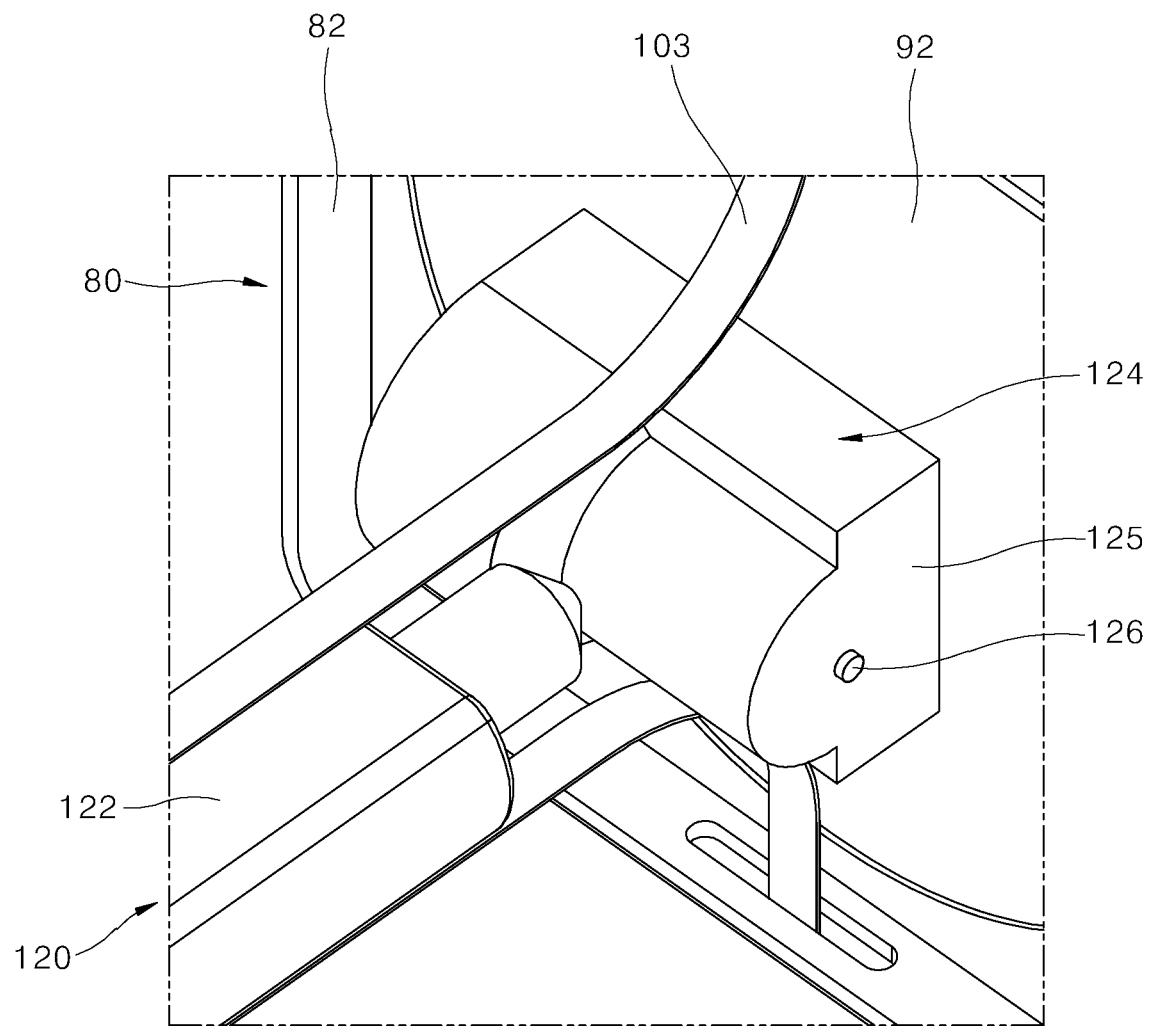
FIG. 5 is a perspective view showing a drive part and a gear box according to an embodiment of the present disclosure.
Figure 6:
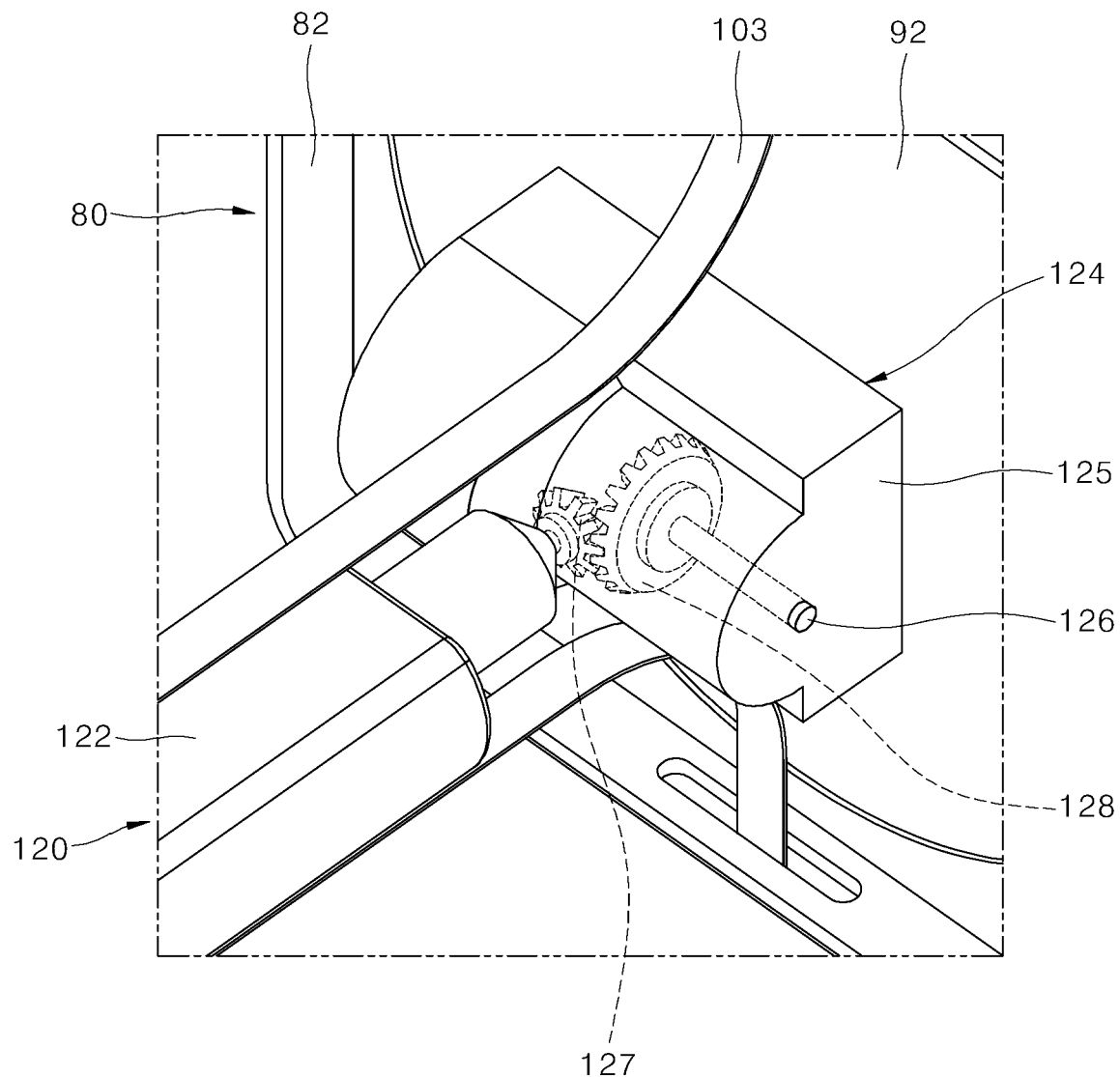
FIG. 6 is a perspective view showing a driving gear and a driven gear according to an embodiment of the present disclosure.

FIG. 4 is a perspective view showing an installation state of an authentication part 120 according to an embodiment of the present disclosure. FIG. 5 is a perspective view showing a drive part 122 and a gear box 124 according to an embodiment of the present disclosure. FIG. 6 is a perspective view showing a driving gear 127 and a driven gear 128 according to an embodiment of the present disclosure.

As shown in FIGS. 1 and 4 to 6, the authentication part 120 may be operated based on a control signal of the controller 110, and may be implemented in various modifications within the technical feature to photograph body information on the user's hand H in contact with the housing 10 and transmit the photographed information to the controller 110. The authentication part 120 may have a variable photographing angle based on the position of the hand H in contact with the housing 10. One camera 123 may photograph the user's hand at a plurality of positions. Accordingly, the number of the required components may be reduced enough to save production cost. The authentication part 120 may photograph a vein among body information on the user's hand H and transmit a measured value to the controller 110. If necessary for user authentication, body information other than the vein may also be photographed by the authentication part 120 and the photographed information may be transmitted to the controller 110. The authentication part 120 according to an embodiment of the present disclosure may include at least one of a drive part 122, a camera 123 and a gear box 124.

The drive part 122 may be disposed inside the housing 10, and may be implemented in various modifications within the technical feature to generate a power. The drive part 122 according to an embodiment of the present disclosure may be fixed to the base 51 provided in the inner housing 50 and a motor for generating a rotational power may be used as the drive part 122.

The gear box 124 may be continuously mounted to the drive part 122, and various types of gear devices may be used as the gear box within the technical feature that the gear box 123 is rotatable by the power of the drive part 122. The gear box according to an embodiment may include a box body 125, a driving gear 127 and a driven gear 128.

The box body 125 may be rotatably mounted inside the housing 10 and configured to be rotated by the power of the drive part 122. The box body 125 may be provided in a shape surrounding the driving gear 127, the driven gear 128 and the camera 123, and may be rotatable inside the inner housing 50. A method of direct connection with the drive part 122 using a motor after a gear structure may be applied to the gear box 124 for fast movement of the camera 123 may be used.

When the first sensor 104 is provided in an upper area of the box body 125 and the second sensor 105 is provided in a lower area of the box body 125, side protrusions 126 may be provided on both width-direction sides of the box body 125 to be inserted in the inner housing 50. Accordingly, the box body 125 may be rotatable in a vertical direction with respect to the side protrusions 126. In addition, a front surface of the box body 125 may be open to facilitate the photographing of the camera 123 and a transparent window may be provided on the open front of the box body 125.

The driving gear 127 may be provided inside the box body 125 and configured to be rotatable by the power transmitted from the drive part 122. An output shaft of the drive part 122 and a rotation center of the driving gear 127 may be the same. The driving gear 127 may be connected to the output shaft of the drive part 122.

The driven gear 128 may be rotated together with the box body 125, and may include a shaft that intersects the rotation shaft of the driving gear 127 to engage with the driving gear 127. The driving gear 127 and the drive gear 128 may be made of bevel gears. The driven gear 128 may be rotated by the rotation of the driving gear 127 to adjust the rotation angle of the box body 125.

The drive part 122 may be a servo motor to precisely control the rotation angle of the box body 125, and may further include an encoder provided therein. Accordingly, the controller 110 may control the operation of the drive part 122 based on a value measured and transmitted by the encoder, only to precisely control a rotation angle of the box body 125 and a rotation angle of the camera 123 installed in the box body 125.

The camera may be provided inside the gear box 124 and rotated together with the gear box 124 by the operation of the drive part 122. The camera may be implemented in various modifications within the technical feature to photograph body information of the user's hand H touching the housing 10 and transmit a measured value to the controller 110. The camera according to an embodiment of the present disclosure may photograph vein information of the user's hand and transmit a measured value to the controller 110.

Hereinafter, referring to the accompanying drawings, an operation state of the door handle 1 having the vein authentication function according to an embodiment will be described.

Figure 7:
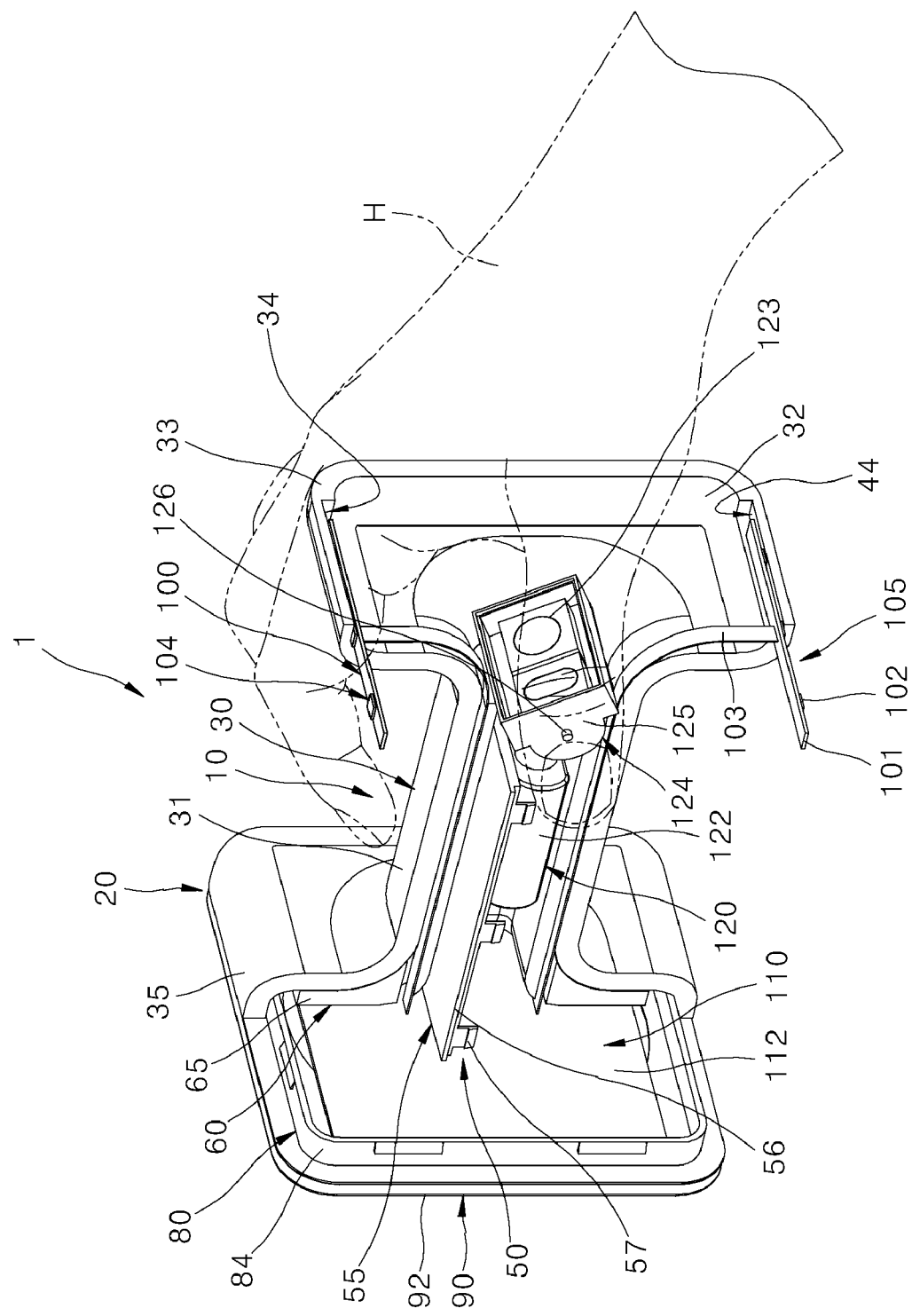
FIG. 7 is a perspective view showing a state where a camera according to an embodiment of the present disclosure photographs a user's vein in the hand after rotating upward.

FIG. 7 is a perspective view showing a state where a camera 123 according to an embodiment of the present disclosure photographs a user's vein in the hand after rotating upward. As shown in FIG. 7, in a state where the door handle 1 having the vein authentication function is protruded from the front of the door A, the user's hand H may touch the upper surface of the door handle 1 having the vein authentication function to open the door. Then, the first sensor 104 of the sensor part 100 may sense the contact of the user's hand H and may transmit a measured value to the controller 110. The controller 110 may determine the presence of the user's hand on the upper surface of the outer housing 20 and may operate the drive part 122 to rotate the gear box 125 upward.

Hence, while the driving gear 127 may be rotated by the operation of the drive part 122, the driven gear 128 may engage with the driving gear 127 and rotate upward together with the gear box 124. The camera 123 provided inside the gear box 124 may rotate upward together with the gear box 124 and may photograph the vein of the user's hand H to transmit a measured value to the controller 110.

The controller 110 may compare the vein of the user's hand H input by the camera 123 with a stored vein to authenticate the user. When authenticating that the user putting the hand H on the housing 10 is the user stored in the controller 110, the controller 110 may automatically unlock the door A.

Accordingly, the user may pull and open the door A to move to the inside of the door A.

Figure 8:
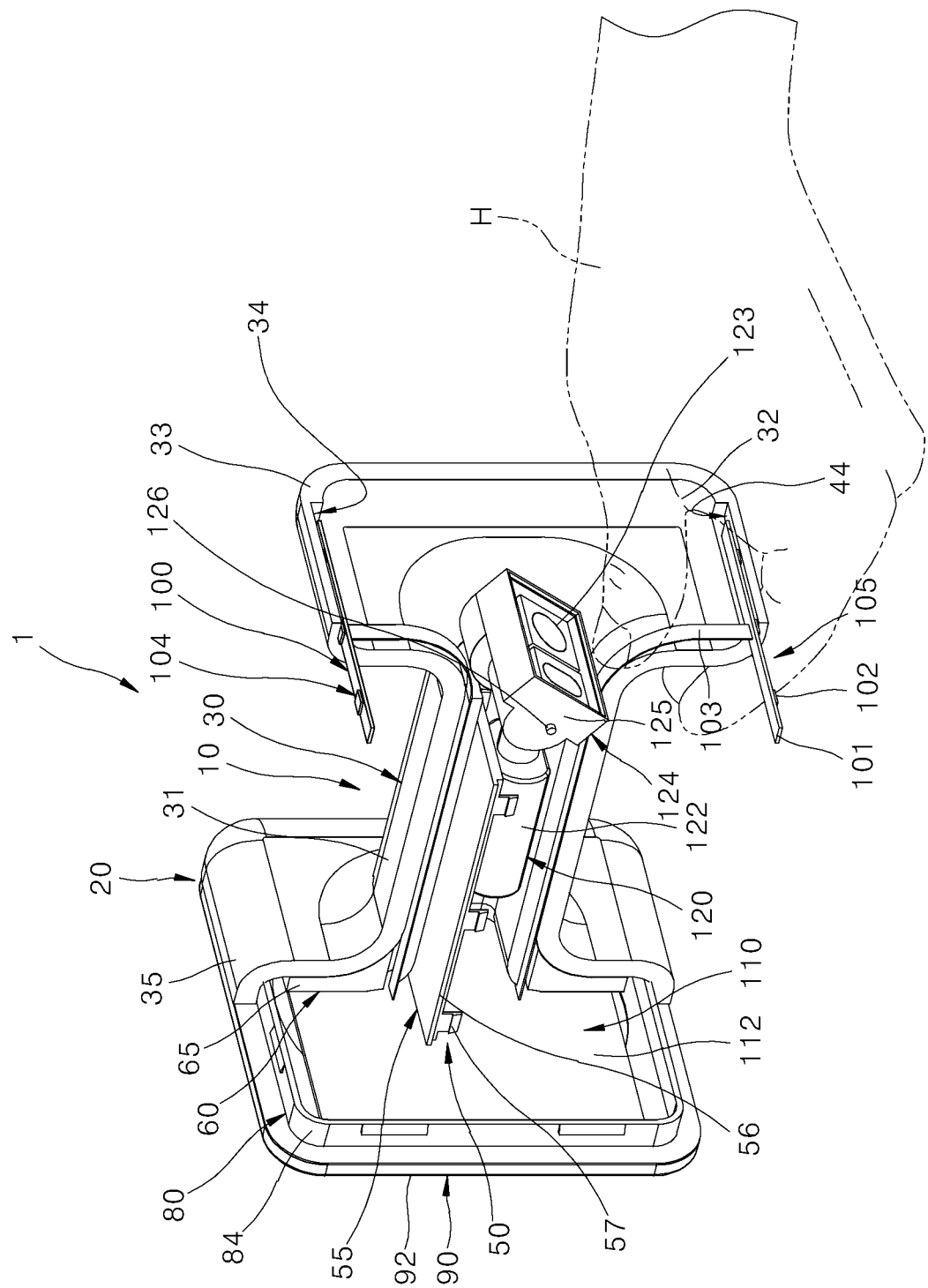
FIG. 8 is a perspective view showing a state where a camera according to an embodiment of the present disclosure photographs a user's vein in the hand after rotating downward.

FIG. 8 is a perspective view showing a state where a camera 123 according to an embodiment of the present disclosure photographs a user's vein in the hand after rotating downward. As shown in FIG. 8, the user's hand H may touch the lower surface of the door handle 1 having the vein authentication function to open the door. Then, the second sensor 105 of the sensor part 100 may sense the contact of the user's hand H and may transmit a measured value to the controller 110. The controller 110 may determine the presence of the user's hand on the lower surface of the outer housing 20 and may operate the drive part 122 to rotate the gear box 125 downward.

Hence, while the driving gear 127 may be rotated by the operation of the drive part 122, the driven gear 128 may engage with the driving gear 127 and rotate downward together with the gear box 124. The camera 123 provided inside the gear box 124 may rotate downward together with the gear box 124 and may photograph the vein of the user's hand H to transmit a measured value to the controller 110.

The controller 110 may compare the vein of the user's hand H input by the camera 123 with a stored vein to authenticate the user. When authenticating that the user putting the hand H on the housing 10 is the user stored in the controller 110, the controller 110 may automatically unlock the door A.

Meanwhile, the door handle 1 having the vein authentication function may have the sensor part 100 installed in each of right and left sides of the housing 10.

Figure 9:
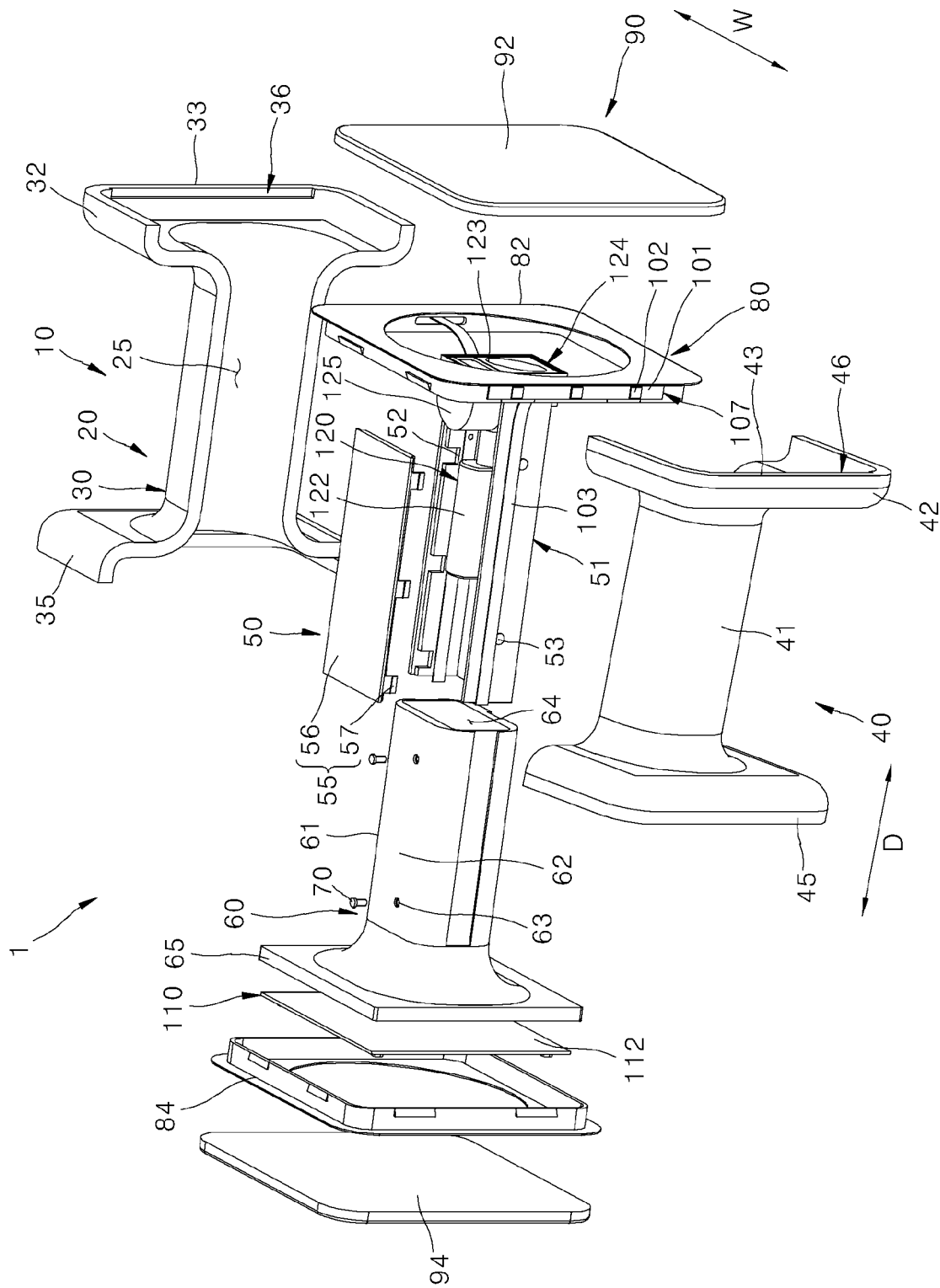
FIG. 9 is an exploded perspective view showing a state where a sensor part according to an embodiment of the present disclosure is installed in each of right and left sides of a housing.
Figure 10:
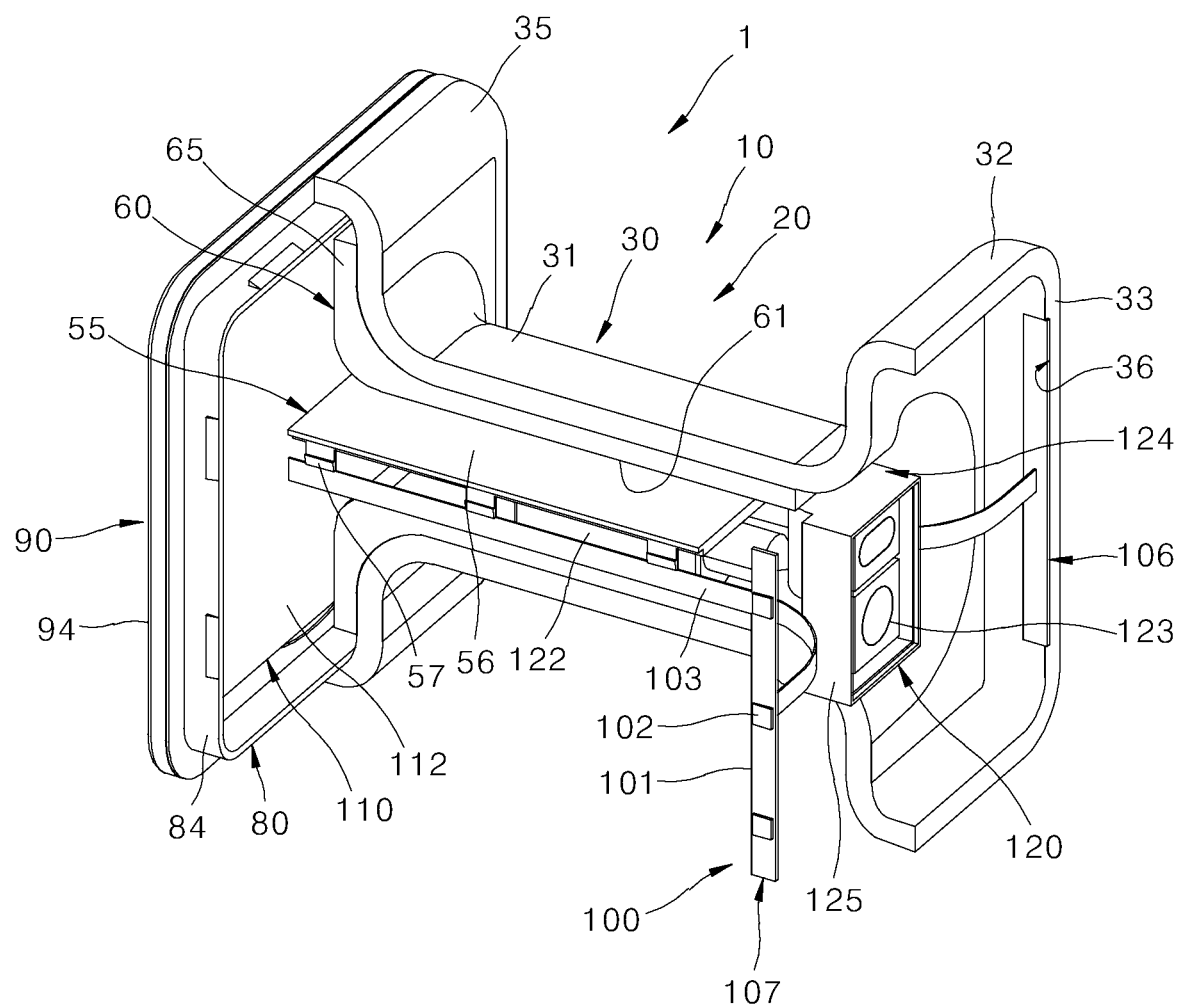
FIG. 10 is a partially cut-away view showing a state where a sensor part according to an embodiment is installed in each of right and left sides of a housing.

FIG. 9 is an exploded perspective view showing a state where a sensor part 100 according to an embodiment of the present disclosure is installed in each of right and left sides of a housing. FIG. 10 is a partially cut-away view showing a state where a sensor part 100 according to an embodiment is installed in each of right and left sides of a housing 10.

As shown in FIGS. 9 and 10, the sensor part 100 installed inside the outer housing 20 may sense the contact of the user's hand and transmit a measured value to the controller 110. To this end, the sensor part 100 may include a third sensor 106 and a fourth sensor 107 that are provided between the outer housing 20 and the first support portion 82. The third sensor 106 may be disposed between a right area of the first support portion 82 and the outer housing 20.

The fourth sensor 107 may be disposed between a left area of the first support portion 82 and the outer housing 20.

A third sensor coupling groove 36 having a concave shape may be provided in an inner surface of the first housing 30 facing the third sensor 106. The third sensor coupling groove 36 may form a band-shaped groove extending along a width direction W of the outer housing 20. Since the third sensor 106 is inserted in the third sensor coupling groove 36, the third sensor 106 may be prevented from damage and may be stably coupled.

A fourth sensor coupling groove 46 having a concave shape may be provided in an inner surface of the second housing 40 facing the third sensor 106. With respect to the first support portion 82, the third sensor coupling groove 36 may be positioned in a right area and the fourth sensor coupling groove 46 may be positioned in a left area. The fourth sensor coupling groove 46 may form a band-shaped groove extending along a width direction W of the outer housing 20, while facing the third sensor coupling groove 36. Since the fourth sensor 106 is inserted in the fourth sensor coupling groove 46, the fourth sensor 107 may be prevented from damage and may be stably coupled.

Alternatively, various modifications may be possible such as the first sensor 104, the second sensor 105, the third sensor 106 and the fourth sensor 107 may be provided along the periphery of the first support portion 82 and two cameras 123 operated based on the measured value of the sensor part 100 may be provided. Meanwhile, the gear box 124 formed in a shape surrounding the camera 123 may be rotatable in a vertical direction.

Figure 11:
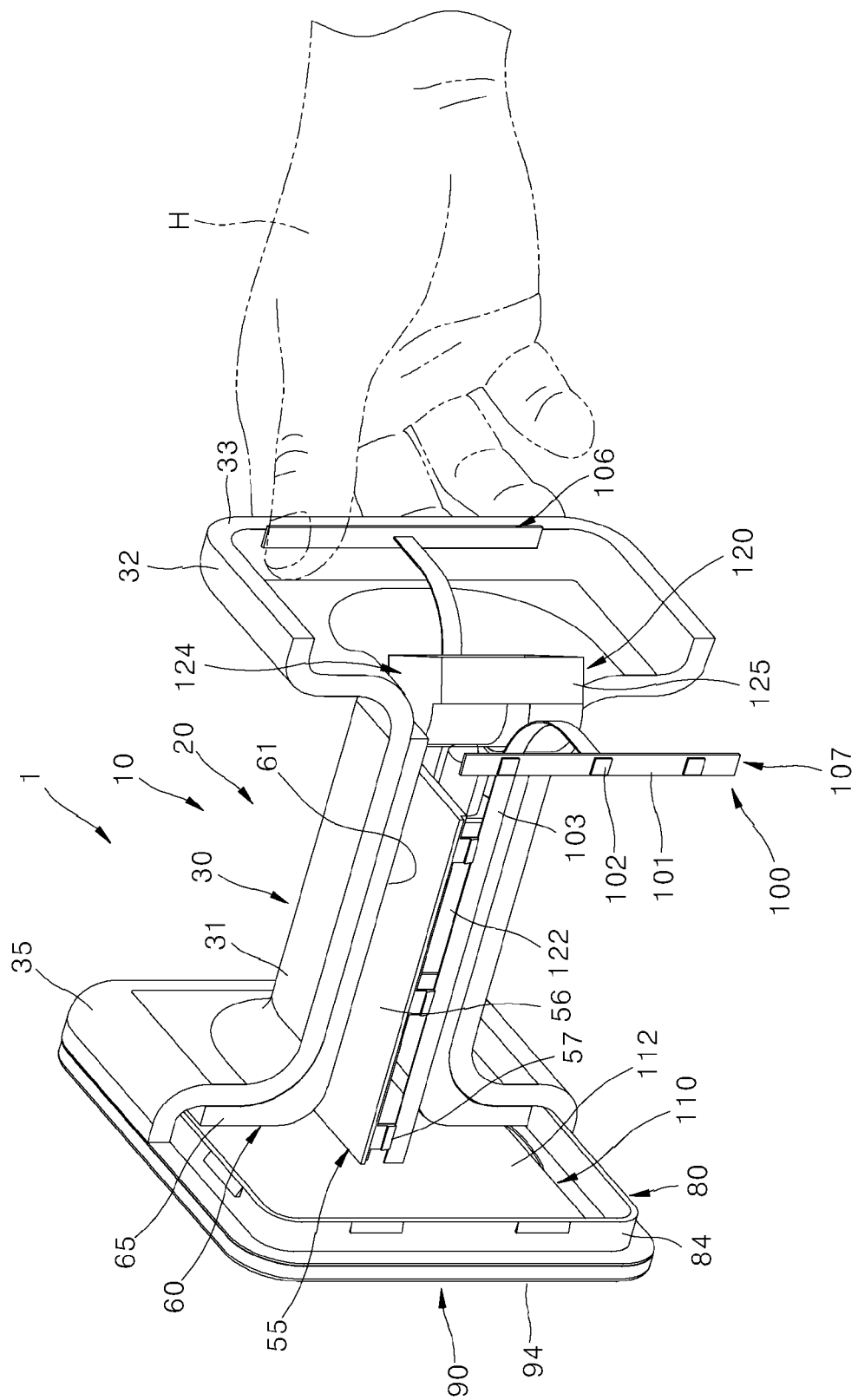
FIG. 11 is a perspective view showing a state where a camera according to an embodiment of the present disclosure photographs a user's vein in the hand after rotating rightward.

FIG. 11 is a perspective view showing a state where a camera 123 according to an embodiment of the present disclosure photographs a user's vein in the hand after rotating rightward. As shown in FIG. 11, the user's hand H may touch the right surface of the door handle 1 having the vein authentication function to open the door. Then, the third sensor 106 of the sensor part 100 may sense the contact of the user's hand H and may transmit a measured value to the controller 110. The controller 110 may determine the presence of the user's hand on the right surface of the outer housing 20 and may operate the drive part 122 to rotate the gear box 125 rightward.

Hence, while the driving gear 127 may be rotated by the operation of the drive part 122 in the rightward direction, the driven gear 128 may rotate rightward together with the gear box 124. The camera 123 provided inside the gear box 124 may rotate rightward together with the gear box 124 and may photograph the vein of the user's hand H to transmit a measured value to the controller 110.

The controller 110 may compare the vein of the user's hand H input by the camera 123 with a stored vein to authenticate the user. When authenticating that the user putting the hand H on the housing 10 is the user stored in the controller 110, the controller 110 may automatically unlock the door A.

Figure 12:
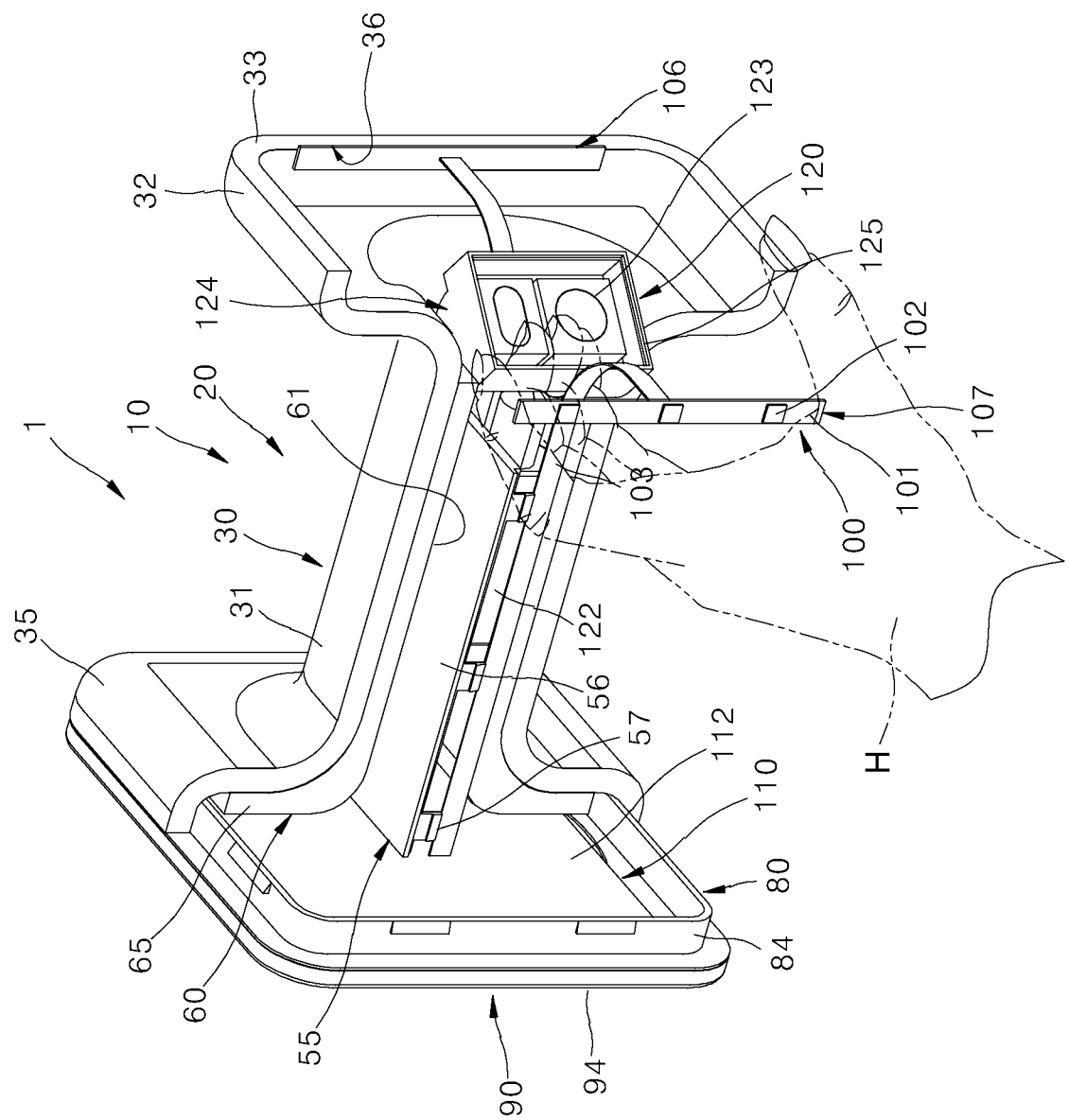
FIG. 12 is a perspective view showing a state where a camera according to an embodiment of the present disclosure photographs a user's vein in the hand after rotating leftward.

FIG. 12 is a perspective view showing a state where a camera 123 according to an embodiment of the present disclosure photographs a user's vein in the hand after rotating leftward. As shown in FIG. 12, the user's hand H may touch the left surface of the door handle 1 having the vein authentication function to open the door. Then, the fourth sensor 107 of the sensor part 100 may sense the contact of the user's hand H and may transmit a measured value to the controller 110. The controller 110 may determine the presence of the user's hand on the left surface of the outer housing 20 and may operate the drive part 122 to rotate the gear box 125 leftward.

Hence, while the driving gear 127 may be rotated by the operation of the drive part 122 in the leftward direction, the driven gear 128 may rotate leftward together with the gear box 124. The camera 123 provided inside the gear box 124 may rotate leftward together with the gear box 124 and may photograph the vein of the user's hand H to transmit a measured value to the controller 110.

The controller 110 may compare the vein of the user's hand H input by the camera 123 with a stored vein to authenticate the user. When authenticating that the user putting the hand H on the housing 10 is the user stored in the controller 110, the controller 110 may automatically unlock the door A.

The camera 123 for vein authentication may be embedded inside the door handle 1 having the vein authentication function according to the present disclosure as described above, and the device for photographing the vein by checking the direction in which the hand H touches based on the operation of the sensor part 100 including a touch sensor may be provided.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

The invention claimed is:

1. A door handle having a vein authentication function, the door handle comprising:
   a housing configured to be provided in a door;
   a sensor provided in the housing and configured to sense a user's hand and measure body information of the user's hand;
   a controller configured to receive the measured body information from the sensor through an electrical connection between the sensor and the controller; and
   an authentication part including:
      a drive part disposed inside the housing, the drive part being configured to generate power;
      a gear box mounted to the drive part, the gear box being rotatable by the power of the drive part; and
      a camera configured to be rotatable together with the gear box,
   wherein the authentication part is configured to:
      receive the measured body information of the user's hand from the controller,
      adjust a position of the authentication part based on the received measured body information,
      photograph the user's hand with the camera, and
      transmit the photograph of the user's hand to the controller.

2. The door handle of claim 1, wherein the authentication part is configured to:
   photograph a vein of the user's hand for the vein authentication function, and transmit a measured vein value to the controller.

3. The door handle of claim 1, wherein the housing includes:
   an outer housing configured to be secured to the door; and
   an inner housing disposed inside the outer housing, and
   wherein the authentication part is mounted to the inner housing.

4. The door handle of claim 3, wherein the outer housing includes:
   a first housing surrounding a first side of the inner housing, and
   a second housing surrounding a second side of the inner housing, the second housing being secured to the first housing, and
   wherein the first side of the inner housing is opposite to the second side of the inner housing.

5. The door handle of claim 4, wherein the first housing includes:
   a first body configured to penetrate the door and accommodating the inner housing;
   a first frame extending from a front surface of the first body; and
   a first end extending from a rear surface of the first body.

6. The door handle of claim 5, wherein the second housing includes:
   a second body configured to penetrate the door and accommodating the inner housing, the second body facing the first body;
   a second frame extending from a front surface of the second body and facing the first frame; and
   a second end extending from the rear surface of the first body and facing the first end of the first housing.

7. The door handle of claim 3, wherein the inner housing includes:
   a housing cover disposed inside the outer housing and provided at a position facing the authentication part; and
   a base surrounding the authentication part and having an inlet configured to be open and closed by the housing cover.

8. The door handle of claim 7, wherein the housing cover includes:
   a cover panel provided in a plate shape; and
   a hooking member extending from the cover panel towards the base of the inner housing,
   wherein the base includes a fixing groove, and
   wherein the hooking member is configured to engage the fixing groove to restrict movement of the housing cover.

9. The door handle of claim 3, wherein the housing further includes a cover configured to form an airtight seal at open ends of the outer housing.

10. The door handle of claim 9, wherein the cover includes:
    a first cover configured to form an airtight seal at a front surface of the outer housing; and
    a second cover configured to form an airtight seal at a rear surface of the outer housing.

11. The door handle of claim 10, wherein the housing further includes a cover support portion disposed between the cover and the outer housing, and
    wherein the cover support portion is configured to restrict movement of the cover.

12. The door handle of claim 11, wherein the cover support portion includes:
    a first support portion disposed between the first cover and the outer housing, the first support portion being configured to restrict movement of the first cover; and
    a second support portion disposed between the second cover and the outer housing, the second support portion being configured to restrict movement of the second cover.

13. The door handle of claim 12, wherein the sensor includes:
    a first sensor disposed between an upper area of the first support portion and the outer housing, the first sensor being configured to sense the user's hand on an upper area of the outer housing; and a second sensor disposed between a lower area of the first support portion and the outer housing, the second sensor being configured to sense the user's hand on a lower area of the outer housing.

14. The door handle of claim 13, wherein the sensor further includes:
   a third sensor disposed between a right area of the first support portion and the outer housing, the third sensor being configured to sense the user's hand on a right area of the outer housing; and
   a fourth sensor disposed between a left area of the first support portion and the outer housing, the fourth sensor being configured to sense the user's hand on a left area of the outer housing.

15. The door handle of claim 3, wherein the sensor is disposed inside the outer housing, and
   wherein the sensor includes the vein authentication function configured to:
      sense the user's hand touching an outside of the outer housing, and
      sense the user's hand in a preset region spaced apart from the outer housing.

16. The door handle of claim 15, wherein the outer housing comprises a rim having a rectangular shape, and
   wherein the sensor is provided inside the rim.

17. The door handle of claim 1,
   wherein the camera is configured to:
      photograph the body information of the user's hand, and
      transmit the body information to the controller.

18. A door handle, comprising:
   a housing configured to be provided in a door;
   an authentication part including:
      a drive part configured to be movable;
      a gear box rotatable by the drive part;
      a camera disposed in the gear box and configured to rotate with a rotation of the gear box, the camera being configured to capture a vein of a user's hand; and
   a controller configured to:
      control the drive part to move the gear box and the camera towards the user's hand, and
      control the camera to photograph the vein of the user's hand to authenticate the user.

19. The door handle of claim 18, wherein the gear box includes:
   a box body;
   a driving gear rotatable by power transmitted from the drive part; and
   a driven gear meshing with the driving gear, and
   wherein the driven gear is rotated together with the box body.

20. The door handle of claim 18, further comprising a sensor configured to determine a position of the user's hand, and
   wherein the controller is further configured to:
      receive the position of the user's hand from the sensor, and
      control the drive part to move the gear box and the camera based on the position of the user's hand.

* * * * *